Dec. 18, 1962     I. H. COHN ETAL     3,068,695
FLOW MEASURING DEVICE
Filed Feb. 8, 1960     3 Sheets-Sheet 1
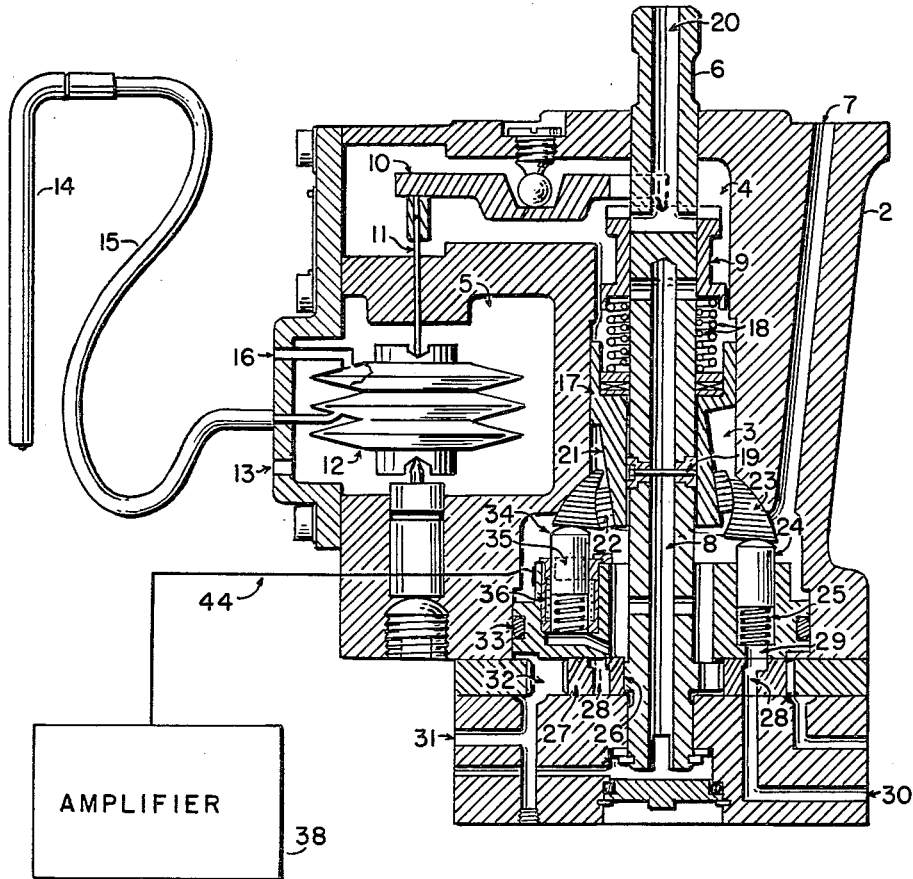
FIG. 1.
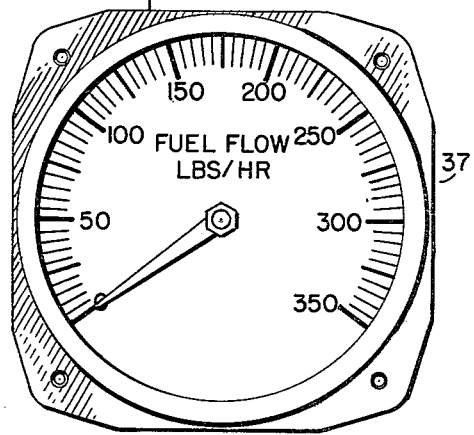
INVENTORS
IRVING H. COHN
SHELDON THALER
BY Dec. 18, 1962 I. H. COHN ETAL 3,068,695
FLOW MEASURING DEVICE
Filed Feb. 8, 1960 3 Sheets-Sheet 3

INVENTORS
IRVING H. COHN
SHELDON THALER
BY

United States Patent Office 3,068,695
Patented Dec. 18, 1962

3,068,695
FLOW MEASURING DEVICE
Irving H. Cohn, New York, N.Y., and Sheldon S. Thaler, Stamford, Conn., assignors to Simmonds Aerocessories, Inc., Tarrytown, N.Y., a corporation of New York
Filed Feb. 8, 1960, Ser. No. 7,279
11 Claims. (Cl. 73—244)

This invention relates to a flow measuring device for a hydraulic reciprocatory pump and more particularly, it is directed principally toward measuring the flow of a fuel injection system.

Fuel injection systems have been employed with internal combustion engines for a number of years, to replace carburetors. For certain installations a fuel injection system provides a much better means of delivering an accurate supply of fuel to the cylinders of an internal combustion engine than does the carburetor type of device because of the ability to control more accurately the supply of fuel which is mixed with the air to make up the charge to the cylinders.

It is well known that fuel injection systems are generally designed to be controlled by four variables: Speed of the engine, intake manifold pressure, intake manifold temperature, and ambient air pressure. The hydraulic pumping device of a fuel injection system must automatically produce a metered quantity of fuel which is compensated over the range of variations in speed, pressures, and temperature which is to be expected with the type of internal combustion engine employed.

One of the problems in the past has been to incorporate in the fuel injection system a device for measuring the rate of fuel flow.

The principal object of the present invention is to provide a positive delivery reciprocating type pump which includes a coil that is inductively coupled to a permanent magnet, the coil being electrically connected through an amplifier to an indicator for displaying rectified voltage.

It is one object of this invention to provide an economical means to measure the rate of fluid flow of a fuel injection pump.

Another object is to provide a means for determining the absolute value of the maximum linear velocity of the injection plungers of a hydraulic reciprocatory pump.

A still further object is to provide an accurate and economical measuring flow device for a fuel injection system which would not require any restrictions in the fuel lines.

Further objects and advantages will become apparent in the full description of the measuring device taken in conjunction with the drawings in which:

FIGURE 1 is an elevation view in cross-section showing a flow measuring device incorporated in a fuel injection system.

Figure 6:
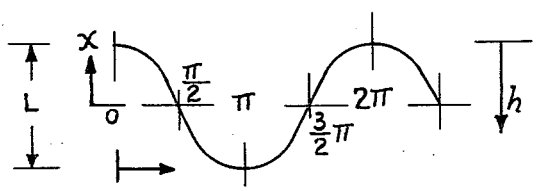

FIGURE 6 indicates harmonic motion of the series of plungers.

Referring now to FIGURE 1, the flow measuring device incorporated in a fuel injection system is provided with a housing 2, first and second operating chambers 3, 4 and a capsule pressure chamber 5. A main drive shaft 6 extends through the aligned chambers 3, 4 and provides the rotational force which operates the various components of the fuel injection pump. Hydraulic pressure is supplied into the chamber 3 through an oil supply connection 7. The oil in the chamber 3 passes through the hollow portion 8 of the shaft 6 and is admitted to the chamber 4 by means of a sleeve valve 9. The axial position of the valve 9 on the shaft 6 is controlled by the lever arm 10 and pin 11 which in turn are operated by a bellows-type capsure assembly 12 within the chamber 5.

A manifold air pressure signal is supplied to capsule chamber 5 through port 13. Manifold air temperature is sensed by temperature bulb 14 and transmitted to the interior of capsule 12 through capillary tube 15. An ambient air pressure signal is transmitted to capsule 12 through port 16. Variations in manifold air pressure, manifold air temperature and ambient pressure control the position of valve 9, which in turn causes changes in the axial position of the skew member 17. The axial movement of skew member 17 effects changes in loading on concentric springs 18. The skew member 17, calibrating springs 18, axially slidable sleeve valve 9, capsule 12, laterally extending lever arm 10 and pin 11 constitute a force balance servo system which serves to position the skew member 17 as a function of manifold air pressure, manifold air temperature and ambient air pressure. The skew member is rotated at the same speed as drive shaft 6 through the medium of drive pin 19. An oil drain connection 20 allows oil to leave chamber 4.

Slideably mounted on the skewed portion 21 of the skew member 17 is a ring 22, the perimeter of which is convex. A wobble plate 23 is slideably mounted around the periphery of the ring 22. The wobble plate 23 is provided with a concave internal face which is complemental to the exterior of said ring 22 and is the means through which a reciprocatory motion is provided to the series of plunger elements 24 in the pump chamber 25. The total amount of displacement during the reciprocatory motion of the plungers 24 will be determined by the angular relationship between the plane surface on the wobble plate 23 in contact with the plungers 24 and the longitudinal axis of shaft 6. Thus when the skew member 17 moves toward the sleeve valve 9, as decreased fuel flow is demanded by variation in manifold air pressure, manifold air temperature, or ambient air pressure, the angle between the plane surface on the wobble plate 23 and the longitudinal axis of shaft 6 will decrease and will cause a corresponding decrease in the total displacement of the plungers 24 in the chamber 25.

The skew member 17 is rotated at the same speed as the shaft 6 which is in turn driven by a positive drive connection with the engine shaft. Thus it can be seen that the plungers 24 will operate sequentially corresponding to the rotation of the shaft 6. The shaft 6 has an eccentric portion 26 which drives a distributor valve 27. The distributor valve 27 has a plurality of discharge ports 28 formed therethrough which, in a timed sequence, correspond with the position of the orifice 29 of the pump chamber 25. Accordingly, it will be understood that the rotation of the distributor valve 27 is such as to provide a positive correlation between the orifice 29 of a single pump chamber 25 with outlet passages 30.

Fuel is supplied to the pump chamber 25 through a suppoly inlet 31 and during the eccentirc movement of the distributor valve 27 is permitted to occupy an annular recess 32 which communicates with the pump chambers 25. A seal 33 positioned in an annular recess of the plunger assembly housing H prevents the entry of oil from chamber 3 into the recess 32.

Outlet passages 30 are connected to the nozzles (not shown) which are positioned in the intake portion of each of the cylinders of an internal combustion engine.

The number of pump chambers 25 in the pump illustrated in FIG. 1 may be any convenient number. However, it has been found convenient in naturally aspirated engines to have each pump chamber 25 provide the charge of fuel for two cylinders. Thus, for a six cylinder engine there would be three pump chambers 25, an eight cylinder engine would require four pump chambers and a twelve cylinder engine would require six pump chambers. The distributor valve 27 serves to supply the fuel being discharged from pump chamber 25 alternately to one engine cylinder during one engine revolution and to a second engine cylinder during the following engine revolution. In supercharged engines, it has been found expedient to connect all the outlet passages 30 together and supply the fuel to the inlet to the supercharger through a single fuel supply line. In an operation such as this, the number of plungers 24 and pump chambers 25 need have no relationship to the number of engine cylinders.

There is in addition to the usual injecting plungers 24, another plunger 34 which is also provided with reciprocatory motion by means of the wobble plate 23. A small permanent magnet 35 is embedded in plunger 34 and is arranged to reciprocate adjacent to a coil 36 which is confined within the chamber through which the plunger 34 moves. See FIG. 2. Coil 36 is electrically connected to indicator 37 through an amplifier 38. Plunger 34 is preferably constructed of a non-magnetic material such as Kel-F.

Figure 2:
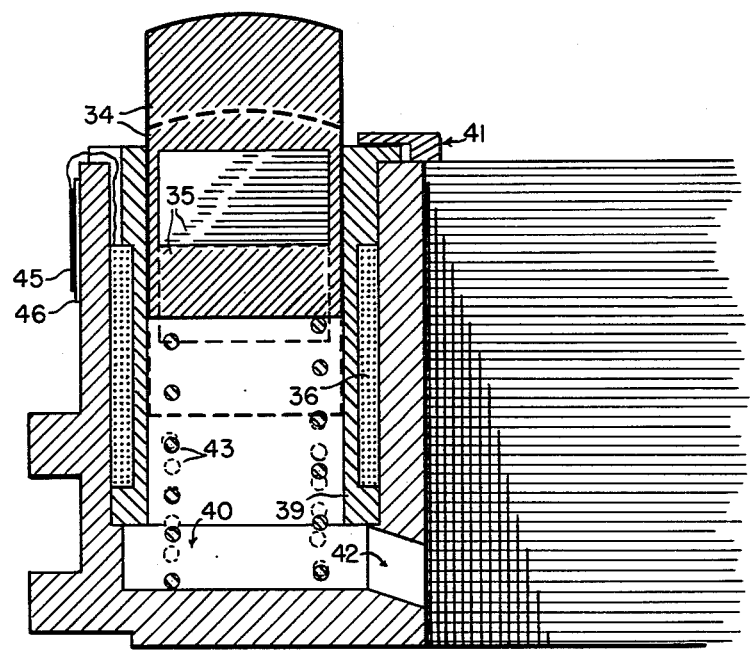
FIGURE 2 is an enlarged cross-sectional view of the flow measuring device shown in FIGURE 1.
Figure 3:
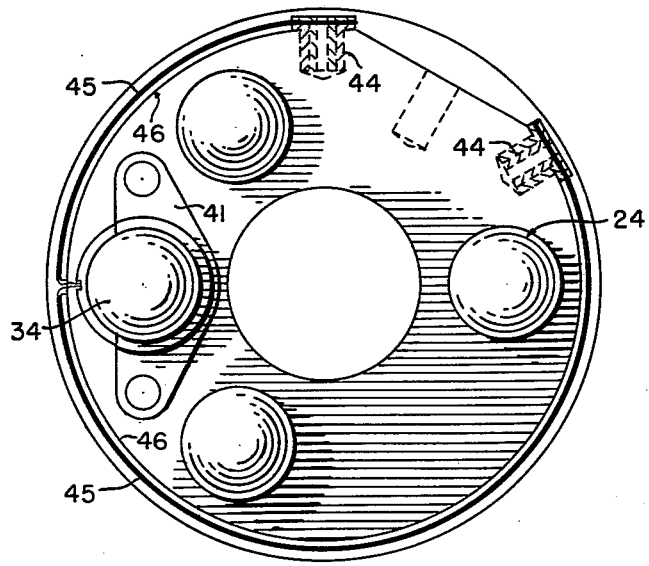
FIGURE 3 is a top plan view of the plunger assembly.
Figure 4:
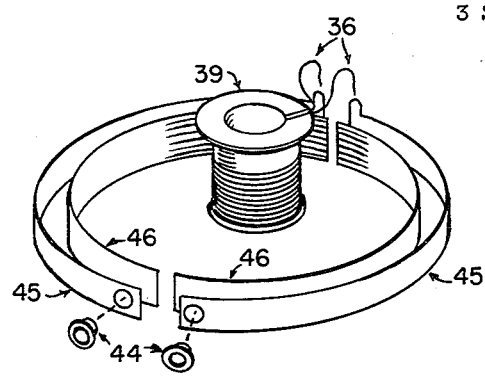
FIGURE 4 is an exploded view of the coil and electrical connectors.

By referring at this time to FIGURES 2, 3, and 4 those skilled in the art will readily comprehend the construction of the flow measuring device which is shown therein in more detail.

The coil 36 is wound on a spool 39 which is retained in the chamber 40 by means of retaining plate 41. A passageway 42 is included to allow oil to flow freely into and out of chamber 40 as plunger 34 reciprocates, thus, preventing hydraulic lock on plunger 34. The spring 43 positioned in one of a series of recesses provided in the plunger assembly housing H forces the plunger 34 into contact with wobble plate 23.

In the full lines of FIGURE 2 the plunger 34 and spring 43 are shown in their extended positions.

The ends of coil 36 are connected to two receptacles 44 by means of conducting strips 45. The conducting strips 45 are electrically insulated by means of insulation strips 46. Electrical contact with receptacles 44 are made through pump housing 2 by connecting pins which are hydraulically sealed to prevent oil leakage from chamber 3, all of which is illustrated in FIG. 1.

Figure 5:
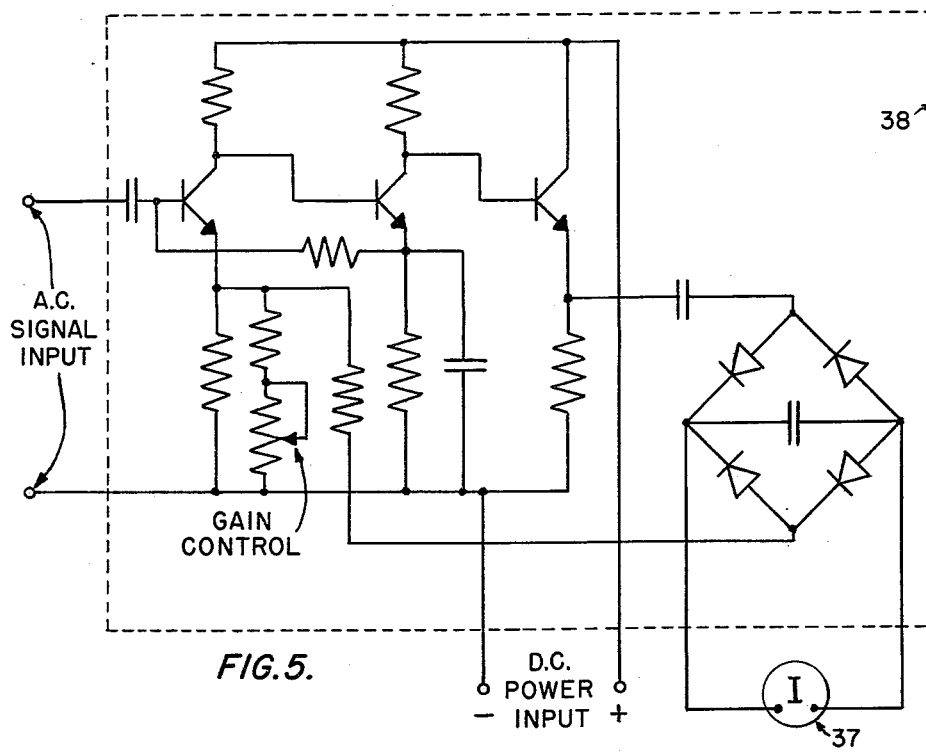
FIGURE 5 is a schematic view of the amplifier and indicator.

The amplifier 38 shown in FIGURES 1 and 5 is of standard construction permitting amplification of the output signal from coil 36 and accurate display on a standard D'Arsonval indicator 37 or other equivalent means. The schematic diagram shown in FIGURE 5 is readily believed understood by those skilled in the art.

In operation, the lines of flux emanating from magnet 35 extend across the coil 36 as the plungers 24 and 34 reciprocate in their respective chambers 25 and 40. The voltage induced in coil 36 is directly proportional to the velocity of the plungers 24 and 34. The following derivations show that the volumetric flow output of the pump 1 is directly proportional to the absolute value of the maximum linear velocity of plungers 24. Since plungers 24 and 34 have exactly the same linear motion, the absolute peak value of induced voltage is therefore shown to be proportional to volumetric flow output of the pump.

The relationship between volumetric flow output of the pump and absolute value of maximum linear velocity of plungers 24 can be derived as follows:

$$Q = LAns \qquad (1)$$

where $L$ = plunger stroke
$A$ = plunger area
$n$ = number of pumping plungers
$S$ = pump speed (RPM)
$Q$ = volumetric pump output Since A and N are constants $$Q = K_1 LS \qquad (2)$$

where $K_1$ = constant

From FIGURE 6, which shows the simple harmonic motion of plungers 24.

$$x = \frac{L}{2} \cos \theta \qquad (3)$$

$$h = \frac{L}{2} - \frac{L}{2} \cos \theta \qquad (4)$$

where $x$ = plunger displacement from mid stroke
$\theta$ = angular position of drive shaft
$h$ = plunger displacement from position at beginning of pumping stroke By differentiation of Equation 4

$$\frac{dh}{dt} = \frac{L}{2} \sin \theta \frac{d\theta}{dt} \qquad (5)$$

$$\frac{dh}{dt} = \frac{\omega L}{2} \sin \theta \qquad (6)$$

where $\omega$ = angular velocity
$= 2\pi S$

To obtain maximum value of $$\frac{dh}{dt}$$

differentiate Equation 6 and set to zero $$\frac{d^2h}{dt^2} = \frac{\omega L}{2} \cos \theta = 0 \qquad (7)$$

Solving Equation 7, $$\frac{dh}{dt} \text{ is maximum when } \theta = \frac{\pi}{2} \text{ or } \frac{3\pi}{2} \qquad (8)$$

Maximum value of $$\frac{dh}{dt}$$

is obtained by substituting values of $\theta$ from (8) in (6) as follows:

$$\text{Maximum } \frac{dh}{dt} = \frac{\omega L}{2} \sin \frac{\pi}{2} \text{ or } \frac{\omega L}{2} \sin \frac{3\pi}{2}$$

$$\text{Maximum } \frac{dh}{dt} = \pm \frac{\omega L}{2} \qquad (9)$$

Substituting in (9) for $\omega = 2\pi S$ $$\text{Maximum } \frac{dh}{dt} = \pm \pi SL \qquad (10)$$

$$\text{Maximum } \frac{dh}{dt} = \pm K_2 LS \qquad (11)$$

where $K_2$ is a constant

From Equations 2 and 11, it can be seen that $$Q = \pm K_3 V_{\text{maximum}} \qquad (12)$$

where $$V = \frac{dh}{dt} \text{ and}$$

$$V_{\text{maximum}} = \text{maximum } \frac{dh}{dt} \text{ and}$$

$K_3$ is a constant.

NOTE: Plus sign in Equation 12 indicates plunger is descending in pumping stroke and the minus sign in Equation 12 indicates plunger is rising in suction stroke.

The relationship between peak voltage induced in coil 36 and absolute value of maximum linear velocity of plunger 34 can be derived as follows:

$$E = N\frac{d\phi}{dt} \quad (13)$$

where $E$ = instantaneous induced voltage
$N$ = number of turns in coil
$\phi$ = total flux linkages cutting the coil In most elementary physics text books it can be shown that Formula 13 can be changed to the following formula:

$$E = BlV \quad (13)$$

where $B$ = flux density
$l$ = length of wire being cut by moving field (length)
$V$ = velocity of the moving field (same as the velocity of the plunger)

Sine B and $l$ are constants $$E = K_4 V = K_4 \frac{dh}{dt} \quad (15)$$

where $K_4$ is a constant $$E_{maximum} = K_4 V_{maximum} \quad (16)$$

Combining Formulas 12 and 16

$$Q = K_5 E_{maximum} \quad (17)$$

where $K_5$ is a constant

As can be seen thus from the above derivations the absolute value of the maximum plunger velocity is proportional to the volumetric output of the pump.

Although induced voltage may be fed directly through leads 44 to an indicating meter, it is preferable to feed the voltage through amplifier 38 so as to obtain greater accuracy.

Generally speaking, substantially similar results can be achieved by the substitution of an electromagnet for the permanent magnet 35 as described herein.

The above described system has been found to be highly satisfactory at all operating speeds. The pump provides a charge of fuel to each of the cylinders of the combustion engine to which the pump was connected which was precisely metered in accordance with the particular engine requirements and gives an accurate measurement in gallons per hour of the fuel flow rate of other suitable volumetric reading. Thus the flow measuring device meters the volumetric flow of fuel from the pump which for a given manifold temperature and pressure is in direct proportion to the speed of the rotation of the drive shaft which is directly coupled to the crankshaft of the engine.

Although this flow measuring device is particularly designed for incorporation in a fuel injection system it is to be understood that it can be used in any hydraulic reciprocatory system where the absolute value of the maximum velocity of the plungers can be measured directly thereby giving an accurate indication of the fluid injected.

It is understood that modifications and variations may be effected without departing from the scope of the novel concepts of the present invention, but it is understood that the application is to be limited only by the scope of the appended claims.

Having thus fully disclosed this invention, we claim:

1. In a variable flow, positive delivery reciprocating type pump, the combination of a flow measuring device, a plurality of sequentially operable reciprocable means, including fluid pump and magnetic means, means for imparting motion of variable amplitude to said reciprocable means, coil means inductively coupled to said magnetic means, means for rectifying the voltage induced in said coil means by the motion of said magnetic means and indicating means responsive to said rectified voltage.

2. In a flow measuring device, the combination of: a fluid metering pump, a plurality of sequentially operable reciprocable means, including fluid pump and magnetic means, means for imparting a reciprocating motion of variable amplitude to said plural means, coil means inductively coupled to said magnetic means, means for rectifying the voltage induced in said coil means by the motion of said magnetic means and indicating means responsive to said rectified voltage.

3. In a flow measuring device, the combination of a fluid metering pump, a plurality of sequentially operable reciprocable means, including fluid pump and magnetic means, means for imparting a reciprocating motion of variable amplitude to said plural means, coil means inductively coupled to said magnetic means, means for rectifying the voltage induced in said coil means by the motion of said magnetic means and indicator means responsive to said rectified voltage.

4. In a flow measuring device, the combination of a fluid metering pump, fluid pumping means therefor, additional means including magnet means, actuating means for imparting a reciprocating motion of variable amplitude to said fluid pumping means and to said additional means, the amplitude of the motion imparted to said additional means being proportional to the amplitude of the motion imparted to said fluid pumping means, coil means inductively coupled to said magnetic means, means for rectifying the voltage induced in said coil means by the motion of said magnetic means and indicating means responsive to said rectified voltage.

5. In a flow measuring device for a fuel injection system comprising: fluid pumping means, additional means including magnetic means, actuating means for imparting a reciprocating motion of variable amplitude to said fluid pumping means and to said additional means, the amplitude of the motion imparted to said additional means being proportional to the amplitude of the motion imparted to said fluid pumping means, coil means inductively coupled to said magnetic means, means for rectifying the voltage induced in said coil means by the motion of said magnetic means and indicating means responsive to said rectified voltage.

6. In a flow measuring device, the combination of: a fluid metering pump, fluid pumping means therefor, additional means including magnetic means, axially displaceable rotary shaft means for imparting a reciprocating motion of variable amplitude to said fluid pumping means and to said additional means, the amplitude of the motion imparted to said additional means being proportional to the amplitude of the motion imparted to said fluid pumping means, coil means inductively coupled to said magnetic means, means for rectifying the voltage induced in said coil means by the motion of said magnetic means and indicating means responsive to said rectified voltage.

7. In a flow measuring device the combination of: a fluid metering pump, at least one fluid pumping plunger therefor, an additional plunger carrying a magnetic means, actuating means for imparting a reciprocating motion of variable amplitude to said fluid pumping plunger and to said additional plunger, the amplitude of the motion imparted to said additional plunger being proportional to the amplitude of the motion imparted to said fluid pumping plunger, coil means inductively coupled to said magnetic means, means for rectifying the voltage induced in said coil means by the motion of said magnetic means and indicating means responsive to said rectified voltage.

8. In a flow measuring device the combination of: a fluid metering pump, at least one fluid pumping plunger therefor, an additional plunger carrying a magnet, actuating means for imparting a reciprocating motion of variable amplitude to said fluid pumping plunger and to said additional plunger, the amplitude of the motion imparted to said additional plunger being proportional to the amplitude of the motion imparted to said fluid pumping plunger, a coil surrounding the path of travel of said additional plunger, means for rectifying the voltage induced in said coil by the motion of said magnet and indicating means responsive to said voltage.

9. In a flow measuring device the combination of: a fluid metering pump, at least one fluid pumping plunger therefor, an additional plunger carrying a magnet, a rotary shaft having a skew shaft concentrically keyed thereto, a wobble plate positioned substantially concentrically with respect to said rotary shaft and operatively connected to said skew shaft by means of a ring slidably positioned therebetween, said wobble plate imparting a reciprocating motion of changeable displacement to said fluid pumping plunger and to said additional plunger, a coil surrounding the path of travel of said additional plunger, means for amplifying and rectifying the voltage induced in said coil by the motion of said magnet and indicating means responsive to said amplified and rectified voltage.

10. In a flow measuring device having a housing and including at least one chamber the combination of: a fluid metering pump, fluid pumping means therefor, an electric coil wound on a spool having an axial bore and positioned in said chamber and retained therein by a plate engaging a portion thereof, a plunger carrying a permanent magnet, said plunger being slidably positioned in the bore of said spool, actuating means for imparting a reciprocating motion to said fluid pumping means and to said plunger, a spring axially located in said chamber for urging said plunger outwardly therefrom and into contact with said actuating means, means connected to said coil for amplifying and rectifying the voltage induced in said coil by the reciprocating motion of said magnet and means responsive to said amplified and rectified voltage.

11. In a fuel injection system for an internal combustion engine having a reciprocating pumping device for sequentially delivering a measured quantity of fuel to each of the cylinders of said engine, said pumping device comprising a plurality of stationary pump chambers each having an outlet orifice, a reciprocating plunger positioned in each of said chambers, rotatable pump shaft means driven by the crank shaft of said engine at a rotational speed corresponding to the rotational speed of said engine, actuating means driven by said pump shaft means for imparting a reciprocating motion of changeable amplitude to said plungers in a timed sequence, rotatable valve means having a plurality of outlet passages formed therein for the delivery of fuel to outlet lines connected to said engine cylinders, said valve means being disposed between said outlet passages and said orifice of said pump chambers and being rotated at a speed capable of permitting the passage of fuel from each of said pump chambers to each of said outlet passages in a timed sequence and flow measuring means comprising an additional reciprocating plunger carrying a magnet, said additional plunger being moved by said actuating means, coil means inductively coupled to said magnet, means for rectifying the voltage induced in said coil means by the motion of said magnet and means responsive to said rectified voltage.

References Cited in the file of this patent
UNITED STATES PATENTS

| | | |
|---|---|---|
| 937,516 | Duenkel | Oct. 19, 1909 |
| 1,662,433 | Murray | Mar. 13, 1928 |
| 1,961,007 | Marvin | May 29, 1934 |
| 2,014,664 | Nicholls | Sept. 17, 1935 |
| 2,661,700 | Towler et al. | Dec. 8, 1953 |
| 2,739,249 | O'Gorman et al. | Mar. 10, 1956 |
| 2,904,701 | Colgate | Sept. 15, 1959 |